United States Patent
Bean

(10) Patent No.: US 9,893,545 B2
(45) Date of Patent: Feb. 13, 2018

(54) VEHICLE CHARGING SYSTEM FOR CHARGING AN AUXILIARY BATTERY FROM A PLURALITY OF POWER SOURCES

(71) Applicant: R.A. Phillips Industries, Inc., Santa Fe Springs, CA (US)

(72) Inventor: Adam Bean, Hacienda Heights, CA (US)

(73) Assignee: PHILLIPS CONNECT TECHNOLOGIES LLC, Santa Fe Springs, CA (US)

( * ) Notice: Subject to any disclaimer, the term of this patent is extended or adjusted under 35 U.S.C. 154(b) by 240 days.

(21) Appl. No.: 14/836,925

(22) Filed: Aug. 26, 2015

(65) Prior Publication Data

US 2017/0063104 A1    Mar. 2, 2017

(51) Int. Cl.
| | |
|---|---|
| *H01M 10/44* | (2006.01) |
| *H01M 10/46* | (2006.01) |
| *H02J 7/00* | (2006.01) |
| *H02J 7/35* | (2006.01) |

(52) U.S. Cl.
CPC ............ *H02J 7/007* (2013.01); *H02J 7/0055* (2013.01); *H02J 7/35* (2013.01)

(58) Field of Classification Search
CPC .............. H02J 7/0068; H02J 7/02; H02J 7/04
USPC ......... 320/104, 118, 138, 140; 307/10.1, 43, 307/48, 80
See application file for complete search history.

(56) References Cited

U.S. PATENT DOCUMENTS

| | | | |
|---|---|---|---|
| 8,004,242 B1 | 8/2011 | Purkey et al. | |
| 8,975,773 B2 * | 3/2015 | Huang | B60L 11/1816 307/9.1 |
| 9,725,000 B2 | 8/2017 | Henningson et al. | |
| 2015/0188360 A1 * | 7/2015 | Doane | H02J 7/35 307/9.1 |

OTHER PUBLICATIONS

Canadian Office action for Canadian Patent Application No. 2,936,536, dated May 15, 2017, dated May 16, 2017, 7 pages.

* cited by examiner

*Primary Examiner* — Edward Tso
(74) *Attorney, Agent, or Firm* — Lewis Roca Rothgerber Christie LLP

(57) ABSTRACT

There is provided a charging system configured to charge an auxiliary battery of a vehicle including a tractor, a trailer, and a converter coupled to the auxiliary battery, the charging system including a switch configured to electrically couple an electrical system of the tractor to the auxiliary battery, a diode network configured to receive electrical power from a plurality of auxiliary power sources and to supply power to the converter, and a controller configured to monitor a first input voltage at an input of the switch, a second input voltage at an output of the diode network, and an auxiliary battery voltage, and to control states of the switch and the converter based on the monitored first and second input voltages and the auxiliary battery voltage.

20 Claims, 3 Drawing Sheets

VEHICLE CHARGING SYSTEM FOR CHARGING AN AUXILIARY BATTERY FROM A PLURALITY OF POWER SOURCES

CROSS-REFERENCE TO RELATED APPLICATION

This application is related to U.S. Pat. No. 7,286,046, issued Oct. 23, 2007, the entire content of which is incorporated herein by reference.

FIELD

The invention relates to the field of vehicle power systems, and particularly to a system and method for charging an auxiliary battery of a vehicle.

BACKGROUND

Trailers used in the medium and heavy duty trucking market are frequently equipped with liftgates that can lower/raise freight to/from the ground. Liftgate motors are powered by an auxiliary battery at the vehicle trailer that receives electrical power to be maintained in a charged state. The auxiliary battery is typically powered from the vehicle's battery or alternator via a junction box on the front of the trailer. The typical output of a tractor alternator is approximately 14 VDC, however, the voltage available at the junction box may generally be no higher than approximately 12.5 VDC. The voltage drop may, for example, be due to the length of a multi-pole connector connecting the electrical system of the tractor to the trailer junction box, which may be about 15 m to about 20 m. In the event that the tractor battery is running low, the voltage at the junction box of the trailer may be even lower than 12.5 VDC, which may be insufficient for fully charging the auxiliary battery at the trailer.

SUMMARY

Aspects of embodiments of the invention are directed toward a charging system in a vehicle capable of charging an auxiliary battery in the vehicle using electrical power from a tractor of the vehicle, provided through a multi-pole connector, and/or auxiliary power sources in the vehicle, such as a refrigeration unit, solar panels, and/or the like. According to some embodiments, the charging system is configured to enable concurrent (e.g., simultaneous) charging of the auxiliary battery by both the tractor electrical system and the auxiliary power sources when, for example, the electrical power flow from the multi-pole connector is insufficient to fully charge the auxiliary battery.

According to some embodiments of the invention, there is provided a charging system configured to charge an auxiliary battery of a vehicle including a tractor, a trailer, and a converter coupled to the auxiliary battery, the charging system including: a switch configured to electrically couple an electrical system of the tractor to the auxiliary battery; a diode network configured to receive electrical power from a plurality of auxiliary power sources and to supply power to the converter; and a controller configured to monitor a first input voltage at an input of the switch, a second input voltage at an output of the diode network, and an auxiliary battery voltage, and to control states of the switch and the converter based on the monitored first and second input voltages and the auxiliary battery voltage.

In an embodiment, the controller is configured to: activate the switch when the first input voltage is greater than the auxiliary battery voltage and the first input voltage is greater than a first threshold, and to deactivate the switch when the first input voltage is less than the auxiliary battery voltage or the first input voltage is less than or equal to the first threshold.

In an embodiment, the converter is configured to receive electrical power from the diode network and to supply a regulated output power to the auxiliary battery.

In an embodiment, the controller is configured to activate the converter when the second input voltage is above a second threshold, and to deactivate the converter when the second input voltage is less than or equal to the second threshold.

In an embodiment, the diode network is configured to provide a unidirectional electrical connection between the auxiliary power sources and the converter, and to prevent flow of electrical power from one of the plurality of auxiliary sources to another one of the plurality of auxiliary sources.

According to some embodiments of the invention, there is provided a charging system configured to charge an auxiliary battery of a vehicle including a tractor and a trailer, the charging system including: a switch configured to electrically couple an electrical system of the tractor to the auxiliary battery; a converter configured to receive electrical power from a plurality of auxiliary power sources and to supply a regulated output power to the auxiliary battery; a controller configured to monitor a first input voltage at an input of the switch, a second input voltage at an input of the converter, and an auxiliary battery voltage, and to control states of the switch and the converter based on the monitored first and second input voltages and the auxiliary battery voltage.

In an embodiment, the controller is configured to: activate the switch when the first input voltage is greater than the auxiliary battery voltage and the first input voltage is greater than a first threshold, and to deactivate the switch when the first input voltage is less than the auxiliary battery voltage or the first input voltage is less than or equal to the first threshold.

In an embodiment, the first threshold is about 12 volts.

In an embodiment, the controller is configured to activate the converter when the second input voltage is above a second threshold, and to deactivate the converter when the second input voltage is less than the second threshold.

In an embodiment, the second threshold is about 12 volts.

In an embodiment, the charging system further includes a diode network configured to provide a unidirectional electrical connection between the auxiliary power sources and the converter.

In an embodiment, the diode network is further configured to prevent flow of electrical power from one of the plurality of auxiliary sources to another one of the plurality of auxiliary sources.

In an embodiment, the diode network includes a plurality of diodes coupled to the auxiliary sources at corresponding anodes and coupled to the converter at corresponding cathodes.

In an embodiment, the plurality of auxiliary sources includes a J560 connection from the tractor, a refrigerator, a solar panel, and/or a generator.

In an embodiment, the converter is a buck-boost DC-to-DC convertor.

In an embodiment, the auxiliary battery is in the trailer and is configured to power a litigate motor of the trailer.

According to some embodiments of the invention, there is provided a method of charging an auxiliary battery of a vehicle including a tractor and a trailer, an electrical system of the trailer including a converter coupled to the auxiliary battery, a switch coupled between an electrical system of the tractor and the auxiliary battery, a diode network coupled between a plurality of auxiliary power sources and the converter, and a controller, the method including: monitoring, by the controller, a first input voltage at an input of the switch, a second input voltage at an output of the diode network, and an auxiliary battery voltage; activating, by the controller, the switch when the first input voltage is greater than the auxiliary battery voltage and the first input voltage is greater than a first threshold; and deactivating, by the controller, the switch when the first input voltage is less than the auxiliary battery voltage or the first input voltage is less than or equal to the first threshold.

In an embodiment, the method further includes: activating, by the controller, the converter when the second input voltage is above a second threshold; and deactivating, by the controller, the converter when the second input voltage is less than or equal to the second threshold.

In an embodiment, wherein the first threshold is about 12 volts, and wherein the second threshold is about 12.5 volts.

In an embodiment, the method further includes deactivating, by the controller, the switch prior to monitoring the first input voltage, the second input voltage, and the auxiliary battery voltage.

BRIEF DESCRIPTION OF THE DRAWINGS

The accompanying drawings, together with the specification, illustrate exemplary embodiments of the invention, and, together with the description, serve to explain aspects of embodiments of the invention. In the drawings, like reference numerals are used throughout the figures to reference like features and components. The figures are not necessarily drawn to scale. The above and other features and aspects of the invention will become more apparent by the following detailed description of illustrative embodiments thereof with reference to the attached drawings, in which.

DETAILED DESCRIPTION

Figure 1:
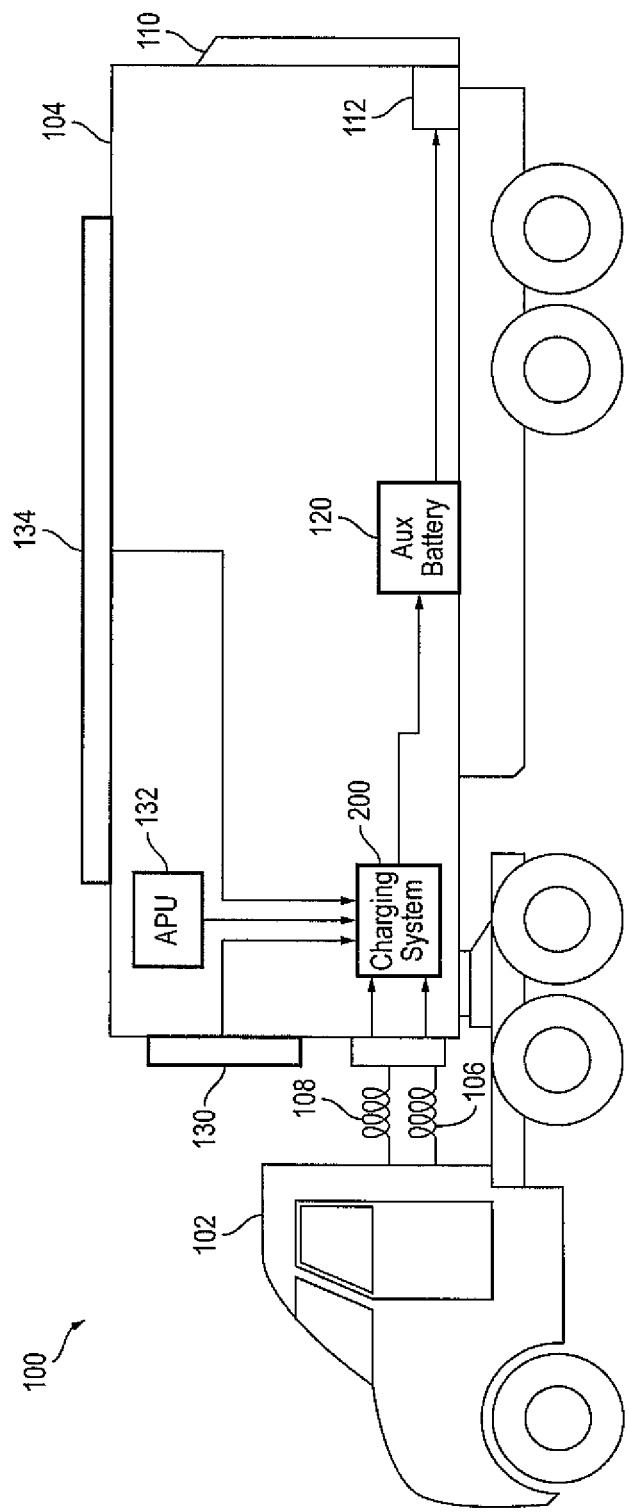
FIG. 1 is a block diagram of a vehicle employing a charging system for charging an auxiliary battery of the vehicle, according to some exemplary embodiments of the invention.

FIG. 1 is a block diagram of a vehicle 100 having a tractor 102 and a trailer 104 and employing a charging system 200 for charging an auxiliary battery 120 (powering a liftgate 110) of the vehicle 100, according to some exemplary embodiments of the invention.

In some embodiments, the electrical system of the tractor 102 of the vehicle 100 supplies electrical power to the electrical system of the trailer 104 via trailer connectors including a first connector (e.g., a single/multi-pole stinger cord) 106 and a second connector (e.g., a SAE J560 connector). The first connector 106, which may be the primary source of power to the electrical system of the trailer 104, is directly coupled to the battery or alternator of the tractor 102 through, for example, a single/dual pole socket at the tractor 102 (e.g., at the junction box of the tractor 102). As a result, the direct connection between the tractor battery or alternator and the first connector 106 is a physical connection that is non-switchable, that is, the electrical connection is present and active irrespective of the tractor ignition being ON or OFF. In some examples, the direct connection may include a fuse, a circuit breaker, and/or one or more mechanical terminals/ports with negligible electrical impedance. The second connector 108, which may be dedicated to the antilock braking system (ABS) of the trailer 104, is coupled to the tractor at a SAE J560 connection (which may at the back of the tractor 102), and may supply a current of up to about 30 A to the electrical system of the trailer 104. The second connector 108 is indirectly coupled to the tractor battery, that is, the second connector 108 is electrically routed to the tractor battery through, for example, a dashboard of a tractor 102 and its constituents components such as, an internal electronic control module (ECU) system, and other components such as fuses, and relays, and/or the like. As such, the indirect connection between the tractor battery and the second connector 108 is also switchable, and may only be established when, for example, the ignition of the tractor 102 is ON and the tractor engine is ON, and/or when another switch (e.g., a bypass switch) is ON to enable power to be supplied to the second connector without having the keys in the tractor 102.

According to some embodiments, the trailer 104 includes a liftgate 110 driven by a trailer motor 112, an auxiliary battery 120 for powering the liftgate motor 112, and a charging system 200 for charging the auxiliary battery 120 and maintaining the voltage at the auxiliary battery 120 within an operable range (e.g., about 13 VDC to about 14.4 VDC). In some embodiments of the invention, the charging system 200 may draw electrical power from the first and second connectors 106 and 108. The trailer 104 may further be equipped with auxiliary power sources, such as a refrigeration unit (henceforth referred to as a "reefer") 130, an alternate power unit (APU) 132, solar panels 134, and/or the like, which, according to some embodiments, act as independent sources of electrical power for charging the auxiliary battery 120 by the charging system 200.

In some embodiments, the charging system 200 utilizes the auxiliary sources of power to supplement the electrical power drawn from the tractor 102 through the first and second connectors 106 and 108 as, in some examples, power drawn from the tractor 102 may not be sufficient for charging the auxiliary battery 120. For example, as the first connector 106 coupled to the single/dual pole socket at the tractor 102 may be quite long (e.g., about 15 m to about 20 m in length), the first connector 106 may incur a significant voltage drop (e.g., 1 v to about 1.5 v) before it reaches the auxiliary battery 120, and thus, the electrical power from the first connector 106 may not be adequate for charging the auxiliary battery 120 to its full capacity. Further, while the second connector 108 may be able to provide ample current (e.g., about 30 A), power transmission through the second connector 108 may be available only when the keys of the vehicle 100 are in the ignition, which may make the vehicle susceptible to theft when idle and lead to inadvertent draw of other auxiliary loads, such as the tractor's ECU, air conditioning unit, heating unit, microwave, and/or the like. By utilizing a converter to draw power from the second connector 108 and the auxiliary power sources, in parallel with the first connector 106, the charging system 200 may ensure that auxiliary battery 120 is adequately charged (e.g., maximally charged).

Figure 2:
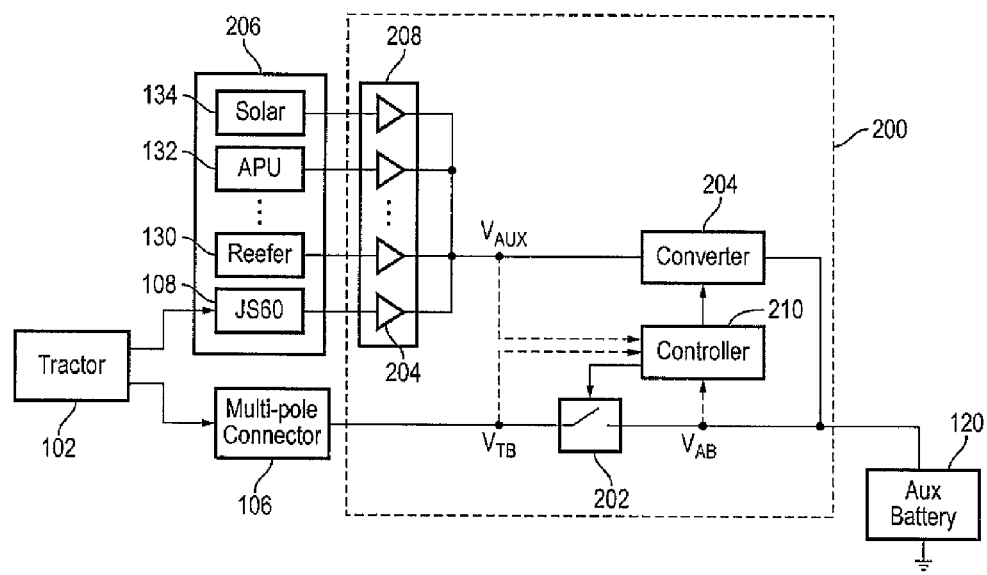
FIG. 2 is a block diagram of the charging system according to some exemplary embodiments of the invention.

FIG. 2 is a block diagram of the charging system 200 according to some exemplary embodiments of the invention.

According to some embodiments, the charging system 200 includes a switch 202 for electrically coupling/decoupling the electrical system of the tractor 102 to/from the auxiliary battery 120, a converter 204 for receiving electrical power from a plurality of auxiliary power sources 206 and supplying a regulated output power to the auxiliary battery 120, a diode network 208 for providing a unidirectional electrical connection from the plurality of auxiliary power sources 206 to the converter 204, and a controller 210 configured to control the switch 202 and the converter 204.

In some embodiments, the switch 202 provides a direct current path from the tractor 102 (e.g., tractor battery or alternator), through the first connector 106, to the auxiliary battery 116. In some examples, the voltage from the tractor may be at about 11.8 VDC to about 12.5 VDC.

In some examples, the plurality of auxiliary power sources 206 includes the second connector 108, the reefer 130, the APU 132 (e.g., a generator), solar panels 134, and/or the like. At any given time, the outputs of the individual ones of the auxiliary power sources 206 may be different voltages. For example, the reefer 130 may supply about 13.5 VDC, while the solar panels 134 may produce various voltages depending on, for example, the availability and intensity of incident sunlight, and the output voltage from the APU 132 may be different from about 13.5 VDC depending on the type of APU used.

Thus, the diode network 208, which includes a plurality of diodes (e.g., high-power diodes) 209 corresponding in number to the number of the auxiliary power sources 206, selects the auxiliary power source having the highest voltage by diode-connecting the outputs of the individual auxiliary power sources, and supplies the selected voltage to the input of the converter 204. The diode network 208 further serves to isolate the auxiliary power sources 206 from one another. That is, the diode network 208 prevents or substantially prevents unintentional discharging of one or more auxiliary power sources 206 through another auxiliary source that may happen to be at a lower voltage. For the same reason, a shorted connection, for example, at one of the auxiliary power sources 206, cannot adversely affect the operation of the remaining one(s) of the auxiliary power sources 206.

The converter 204 may be a buck-boost DC-to-DC convertor that regulates the output voltage of the diode network 208 and supplies a substantially constant voltage of about 13.8 VDC to about 14.4 VDC (or a substantially constant current) to the auxiliary battery 120. In some examples, the converter 204 may be current-limited to about 25 A.

As such, the plurality of the auxiliary power sources 206 may provide, through the converter 204, a current path to the auxiliary battery 120 that is parallel to that from the first connector 106 through the switch 202. The operation of this parallel current paths is controlled by the controller 210.

According to some embodiments, the controller 210 includes sensors for monitoring (e.g., sampling/measuring) a first input voltage $V_{TB}$ corresponding to a voltage of the tractor battery, a second input voltage $V_{AUX}$ corresponding to a voltage of the auxiliary power sources 206, and the voltage $V_{AB}$ corresponding to a voltage of the auxiliary battery 120. The controller 210 then controls the operation of the switch 202 and the converter 204 by activating (e.g., closing/turning ON) or deactivating (e.g., opening/turning OFF) the switch 202 and the converter 204 based on the monitored voltages. In some example, the controller 210 may monitor the first input voltage $V_{TB}$ at a junction box of the trailer 104, at the input terminal of the switch 202, or at any other suitable location between the tractor 102 and the input of the switch 202. Further, the controller 210 may monitor the second input voltage $V_{AUX}$ at the output of the diode network 208, at the input of the converter 204, or at any other suitable location. Additionally, the controller 210 may monitor the voltage $V_{AB}$ at the output of the switch 202, at the terminals of the auxiliary battery 120, or at any suitable location therebetween. In some embodiments, prior to measuring the voltages $V_{TB}$ and $V_{AB}$, the controller 210 first deactivates (e.g., opens) the switch 202 to shut off any current flow through the first connector 106. As a result, the voltage drop across the first connector 106 becomes approximately zero, and the voltage at the input of the switch becomes approximately that of the tractor battery.

In some embodiments, when the first input voltage $V_{TB}$ is greater than or equal to the auxiliary battery voltage $V_{AB}$ plus a constant value K (where the constant value K is in the range of about 0 V to about 1V, e.g., 0 V or 0.5 V) and the first input voltage $V_{TB}$ is greater than a first threshold (e.g., about 12V), the controller 210 is configured to activate the switch 202 to allow the electrical system of the tractor 102 (e.g., the tractor battery or alternator) to charge the auxiliary battery 120. In some examples, the first threshold may be in the range of about 12 V to about 13 V, however, embodiments of the present invention are not limited thereto, and the first threshold may assume any suitable value appropriate for a given application. When the first input voltage $V_{TB}$ is below the first threshold, which may occur when, for example, the tractor battery is at a low voltage, the controller 210 deactivates the switch 202 to cut-off current flow from the tractor 102 to the auxiliary battery 120. Thus, the controller 210 prevents the auxiliary battery 120 from draining the tractor battery beyond an operational minimum. Additionally, when the first input voltage $V_{TB}$ is less than the auxiliary battery voltage $V_{AB}$ plus the constant value K (i.e., when the auxiliary battery 120 is charged to a voltage higher than that provided from the tractor 102 through the first connector 106), the controller 210 is configured to deactivate the switch 202 to prevent any current backflow from the auxiliary battery 120 to the tractor 102. This may occur, for example, when the tractor is not in motion and the engine of the tractor 102 is turned OFF.

According to some embodiments, when the second input voltage $V_{AUX}$ is above a second threshold (which may be in the range of about 10 V to about 14 V, e.g., may be 12.5 V), the controller 210 is configured to activate the converter 204 to allow the converter 204 to regulate the output voltage $V_{AUX}$ of the diode network and to charge the auxiliary battery 120 off of the auxiliary power sources 206. When the second input voltage $V_{AUX}$ is less than the second threshold, which may occur, for example, when the reefer voltage is below an operational minimum or when the solar panels do not receive any solar energy, the controller 210 is configured to deactivate the converter 204, thus preventing the auxiliary power sources 206 from charging the auxiliary battery 120.

When the voltage being supplied from the tractor 102 through the first connector 106 is insufficient to fully charge the auxiliary battery 120, the controller 210 may activate the converter 204 to allow the auxiliary battery 120 to be further charged by the auxiliary power sources 206 and to bring the auxiliary battery 120 to a fully charged state. Further, when the charging voltage at the output of the converter 204, that is, $V_{AB}$ (or $V_{AB}$ plus the constant value K) is greater than the voltage supplied from the tractor 102 through the first connector 106 (i.e., $V_{TB}$), the controller 210 deactivates the switch 202 to prevent backfeeding of current from the auxiliary power sources 206 to the tractor 102.

After making the above-stated determinations, the controller 210 may then wait for a period of time to pass before repeating the process by opening switch 202 (if not already opened) and measuring voltages $V_{TB}$, $V_{AUX}$, and $V_{AB}$. In some examples, the period of time may be preprogrammed into the controller 210, or may be externally set via a time set signal. The period of time may be, for example, about 5 minutes, 10 minutes, or any suitable amount of time as appropriate in a given application.

In embodiments in which the trailer is equipped with an antilock braking system (ABS), the controller 210 may further monitor (e.g., continuously monitor or monitor at set internals) a brake light signal from the tractor 102 to determine if the brakes have been applied while the vehicle is in motion. When such determination is made, the controller 210 may deactivate the switch 202 to stop the flow of current from the trailer 102 to the auxiliary battery 120, so that the trailer 102 is able to deliver adequate power to the ABS. In some examples, the controller 210 may also deactivate the converter when such determination is made.

While the examples illustrated in the FIG. 2 include the converter 204 as part of the charging system 200, embodiments of the invention are not limited thereto. For example, in some embodiments, the converter 204 may be external to, and separate from, the charging system 200. In such embodiments, the charging system 200 may supply the output of the diode network 208 and a control signal from the controller 210 to an external converter, and couple the output of the switch 202 with the output of the converter 204 at, or before, the terminals of the auxiliary battery 120.

Figure 3:
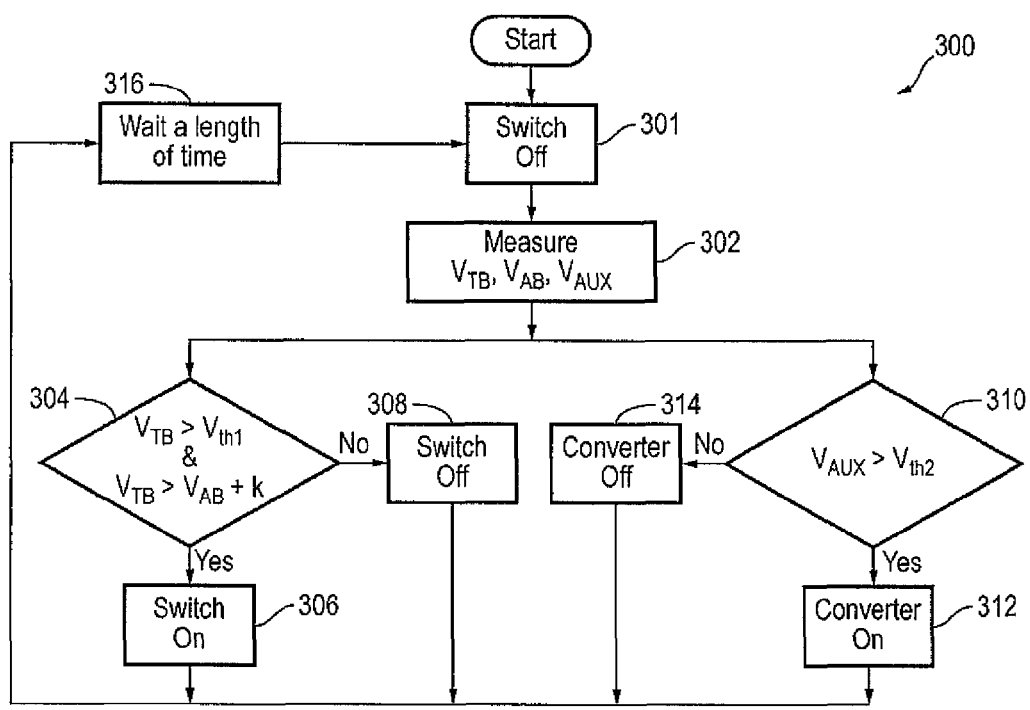
FIG. 3 is a flow diagram illustrating the process of controlling the charging of the auxiliary battery by a controller of the charging system, according to some embodiments of the invention.

FIG. 3 is a flow diagram illustrating the process 300 of controlling the charging of the auxiliary battery 120 by the controller 210, according to some embodiments of the invention.

In block 301, the controller 210 deactivates (e.g., opens) the switch 202 to shut off any current flow through the first connector 106. As such, the voltage drop across the first connector 106 becomes approximately zero, and the voltage at the input of the switch becomes approximately that of the tractor battery.

In block 302, the controller 210 measures the first input voltage $V_{TB}$ at the input of the switch 202, the second input voltage $V_{AUX}$ at the input of the converter 204, and the auxiliary battery voltage $V_{AB}$.

In block 304, the controller 210 determines if the first input voltage $V_{TB}$ is greater than both a first threshold (which may be in the range of about 12 V to about 13 V, e.g., may be 12 V) and the auxiliary battery voltage $V_{AB}$ plus a constant value K (where the constant value K is in the range of about 0 V to about 1V, e.g., 0 V or 0.5 V). If so, in block 306, the controller 210 activates (e.g., closes) the switch 202 and allows the electrical system of the tractor 102 to charge the auxiliary battery 120. Otherwise, in block 308, the controller 210 deactivates (e.g., opens) the switch 202 to cut off current flow from the tractor 102 to the auxiliary battery 120 and to, for example, prevent the auxiliary battery 120 from draining the tractor battery beyond an operational minimum.

In block 310, the controller 210 determines if the second input voltage $V_{AUX}$ is greater than a second threshold (which may be in the range of about 10 V to about 14 V, e.g., may be 12.5 V). If so, in block 312, the controller 210 activates (e.g., powers ON) the converter 204 to enable the converter 204 to regulate (e.g., reduce or boost) the output voltage $V_{AUX}$ of plurality of auxiliary power sources 206 to charge the auxiliary battery 120. Otherwise, in block 314, the controller 210 deactivates (e.g., powers OFF) the converter 204 to prevent the auxiliary power sources 206 from charging the auxiliary battery 120.

In block 316, the controller 210 may then wait for a period of time to pass before repeating the process 300 at block 301. In some examples, the period of time may be preprogrammed into the controller 210, or may be externally set via a time set signal. The period of time may be, for example, about 5 minutes, 10 minutes, or any suitable amount of time as appropriate in a given application.

In some examples, the switch 202 may include an electromechanical switch, such as a soleneoid, capable of handling currents as high as about 100 A to about 200 A. In other examples, other types of suitable switches may be used, such as mechanical or solid state relays, MOSFETs, thyristors, and/or the like.

While in some examples, the auxiliary battery 120 may be a liftgate battery, embodiments of the invention are not limited thereto. For example, the auxiliary battery 120 may be a battery bank used to power a forklift, a palletjack, and/or the like. Further, the charging system 200 may be used, in some embodiments, to manage power to devices other than an auxiliary battery, for example, auxiliary lights, sensors, and/or the like.

While this invention has been described in detail with particular references to illustrative embodiments thereof, the embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims and equivalents thereof.

It will be understood that, although the terms "first", "second", "third", etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section discussed below could be termed a second element, component, region, layer or section, without departing from the spirit and scope of the inventive concept.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include," "including," "comprises," and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the inventive concept." Also, the term "exemplary" is intended to refer to an example or illustration.

As used herein, the term "substantially," "about," and similar terms are used as terms of approximation and not as terms of degree, and are intended to account for the inherent variations in measured or calculated values that would be recognized by those of ordinary skill in the art.

As used herein, the terms "use," "using," and "used" may be considered synonymous with the terms "utilize," "utilizing," and "utilized," respectively.

The controller and/or any other relevant devices or components according to embodiments of the invention described herein may be implemented utilizing any suitable hardware, firmware (e.g. an application-specific integrated circuit), software, or a suitable combination of software, firmware, and hardware. For example, the various components of the controller may be formed on one integrated circuit (IC) chip or on separate IC chips. Further, the various components of the controller may be implemented on a flexible printed circuit film, a tape carrier package (TCP), a printed circuit board (PCB), or formed on a same substrate as the controller. Further, the various components of the controller may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the invention.

What is claimed is:

1. A charging system configured to charge an auxiliary battery of a vehicle comprising a tractor, a trailer, and a converter coupled to the auxiliary battery, the charging system comprising:
   a switch configured to electrically couple an electrical system of the tractor to the auxiliary battery, the switch and the converter being at separate and parallel current paths to the auxiliary battery;
   a diode network configured to receive electrical power from a plurality of auxiliary power sources and to supply power to the converter; and
   a controller configured to monitor a first input voltage at an input of the switch, a second input voltage at an output of the diode network, and an auxiliary battery voltage, and to control states of the switch and the converter based on the monitored first and second input voltages and the auxiliary battery voltage.

2. The charging system of claim 1, wherein the controller is configured to:
   activate the switch when the first input voltage is greater than the auxiliary battery voltage and the first input voltage is greater than a first threshold, and to
   deactivate the switch when the first input voltage is less than the auxiliary battery voltage or the first input voltage is less than or equal to the first threshold.

3. The charging system of claim 2, wherein the first threshold is about 12 volts.

4. The charging system of claim 1, wherein the converter is configured to receive electrical power from the diode network and to supply a regulated output power to the auxiliary battery.

5. The charging system of claim 1, wherein the controller is configured to activate the converter when the second input voltage is above a second threshold, and to deactivate the converter when the second input voltage is less than or equal to the second threshold.

6. The charging system of claim 5, wherein the second threshold is about 12.5 volts.

7. The charging system of claim 1, wherein the diode network is configured to provide a unidirectional electrical connection between the auxiliary power sources and the converter, and to prevent flow of electrical power from one of the plurality of auxiliary sources to another one of the plurality of auxiliary sources.

8. The charging system of claim 1, wherein the diode network comprises a plurality of diodes coupled to the auxiliary sources at corresponding anodes and coupled to the converter at corresponding cathodes.

9. The charging system of claim 1, wherein the plurality of auxiliary sources comprises one or more of a J560 connection from the tractor, a refrigerator, a solar panel, and a generator.

10. The charging system of claim 1, wherein the converter is a buck-boost DC-to-DC convertor.

11. The charging system of claim 1, wherein the auxiliary battery is in the trailer and is configured to power a liftgate motor of the trailer.

12. A charging system configured to charge an auxiliary battery of a vehicle comprising a tractor and a trailer, the charging system comprising:
   a switch configured to electrically couple an electrical system of the tractor to the auxiliary battery;
   a converter configured to receive electrical power from a plurality of auxiliary power sources and to supply a regulated output power to the auxiliary battery, the switch and the converter being at separate and parallel current paths to the auxiliary battery;
   a controller configured to monitor a first input voltage at an input of the switch, a second input voltage at an input of the converter, and an auxiliary battery voltage, and to control states of the switch and the converter based on the monitored first and second input voltages and the auxiliary battery voltage.

13. The charging system of claim 12, wherein the controller is configured to:
   activate the switch when the first input voltage is greater than the auxiliary battery voltage and the first input voltage is greater than a first threshold, and to
   deactivate the switch when the first input voltage is less than the auxiliary battery voltage or the first input voltage is less than or equal to the first threshold.

14. The charging system of claim 12, wherein the controller is configured to activate the converter when the second input voltage is above a second threshold, and to deactivate the converter when the second input voltage is less than or equal to the second threshold.

15. The charging system of claim 12, further comprising a diode network configured to provide a unidirectional electrical connection between the auxiliary power sources and the converter, and to prevent flow of electrical power from one of the plurality of auxiliary sources to another one of the plurality of auxiliary sources.

16. The charging system of claim 15, wherein the diode network comprises a plurality of diodes coupled to the auxiliary sources at corresponding anodes and coupled to the converter at corresponding cathodes.

17. A method of charging an auxiliary battery of a vehicle comprising a tractor and a trailer, an electrical system of the trailer comprising a converter coupled to the auxiliary battery, a switch coupled between an electrical system of the tractor and the auxiliary battery, a diode network coupled between a plurality of auxiliary power sources and the converter, and a controller, the method comprising:
- monitoring, by the controller, a first input voltage at an input of the switch, a second input voltage at an output of the diode network, and an auxiliary battery voltage;
- activating, by the controller, the switch when the first input voltage is greater than the auxiliary battery voltage and the first input voltage is greater than a first threshold; and
- deactivating, by the controller, the switch when the first input voltage is less than the auxiliary battery voltage or the first input voltage is less than or equal to the first threshold, wherein the switch and the converter are at separate and parallel current paths to the auxiliary battery.

18. The method of claim 17, further comprising:
- activating, by the controller, the converter when the second input voltage is above a second threshold; and
- deactivating, by the controller, the converter when the second input voltage is less than or equal to the second threshold.

19. The method of claim 18, wherein the first threshold is about 12 volts, and wherein the second threshold is about 12.5 volts.

20. The method of claim 17, further comprising deactivating, by the controller, the switch prior to monitoring the first input voltage, the second input voltage, and the auxiliary battery voltage.

* * * * *